No. 12,259. REISSUED AUG. 23, 1904.
J. AITKEN.
ROTARY PUMP FOR AIR, WATER, OR OTHER FLUIDS.
APPLICATION FILED JUNE 4, 1904
5 SHEETS—SHEET 1.
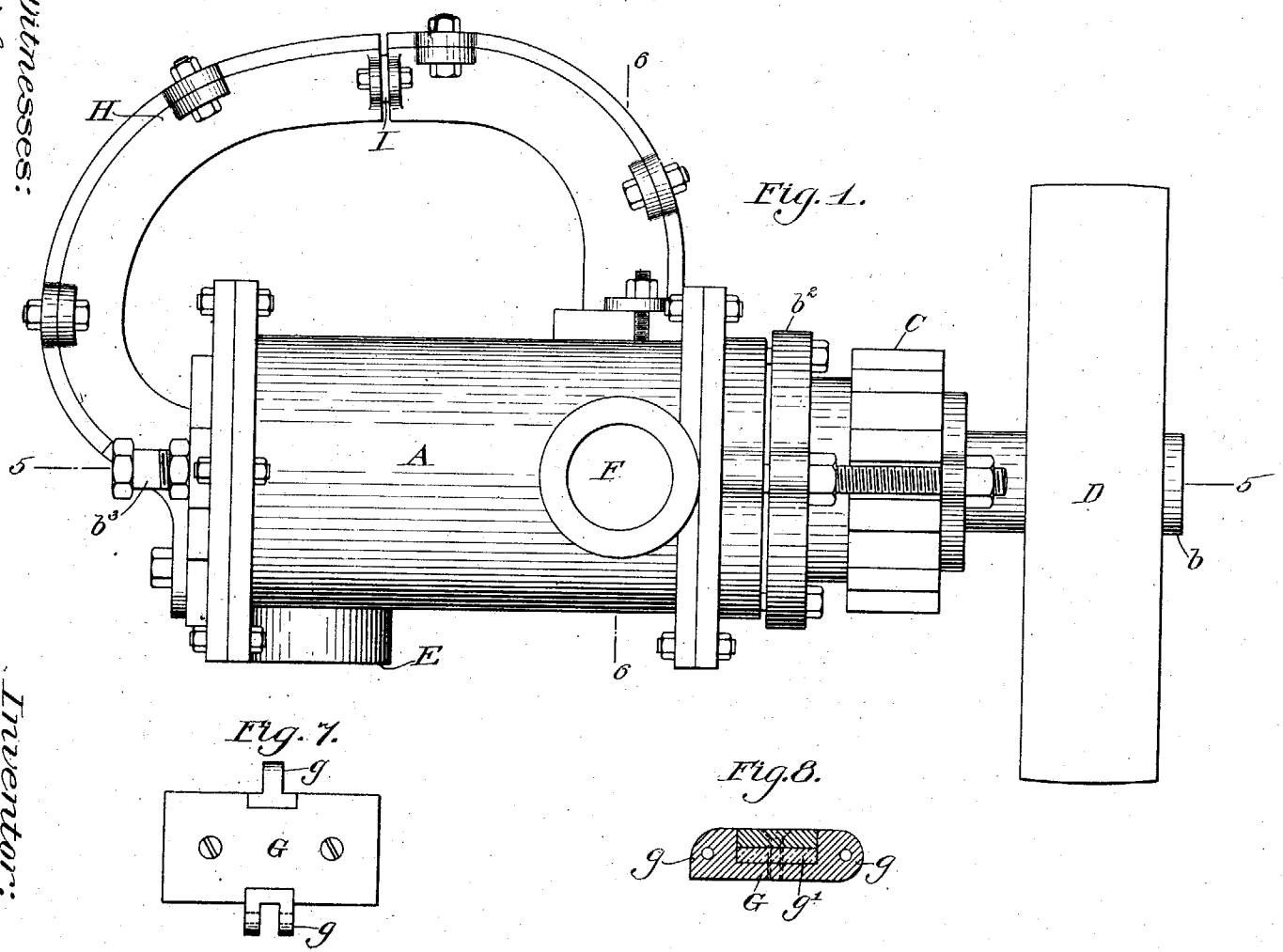
Witnesses:
Horace A. Crossman
Everett P. Emery.
Inventor:
James Aitken
by Emery Booth Powell
Attys No. 12,259. REISSUED AUG. 23, 1904.
J. AITKEN.
ROTARY PUMP FOR AIR, WATER, OR OTHER FLUIDS.
APPLICATION FILED JUNE 4, 1904.
5 SHEETS—SHEET 2.
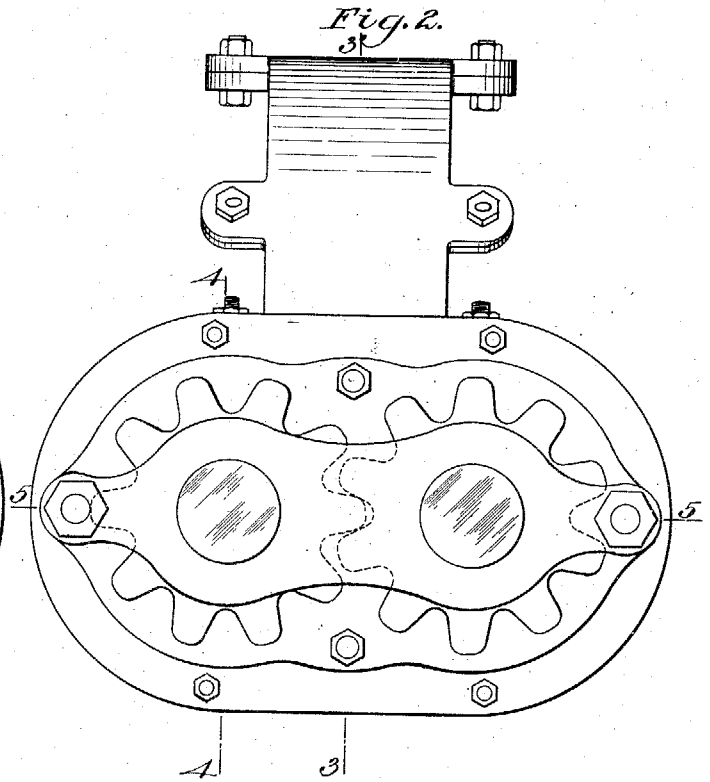
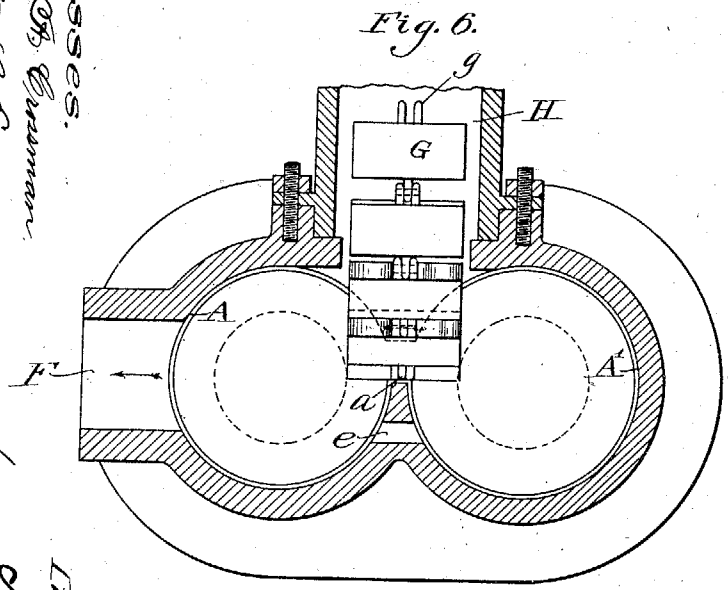
Witnesses.
Horace A. Crossman
Everett S. Emery
Inventor:
James Aitken
by Emery Booth Powell
attys No. 12,259. REISSUED AUG. 23, 1904.

J. AITKEN.

ROTARY PUMP FOR AIR, WATER, OR OTHER FLUIDS.

APPLICATION FILED JUNE 4, 1904.

5 SHEETS—SHEET 3.

Witnesses:
Horace A. Crossman
Everett S. Ewing

Inventor:
James Aitken
by Emery Booth & Powell
Attys.

No. 12,259. REISSUED AUG. 23, 1904.

J. AITKEN.

ROTARY PUMP FOR AIR, WATER, OR OTHER FLUIDS.

APPLICATION FILED JUNE 4, 1904.

5 SHEETS—SHEET 4.

Witnesses:
Horace A. Crossman
Everett S. Earney

Inventor:
James Aitken
by Emery Booth & Porrell
Attys.

No. 12,259. REISSUED AUG. 23, 1904.
J. AITKEN.
ROTARY PUMP FOR AIR, WATER, OR OTHER FLUIDS.
APPLICATION FILED JUNE 4, 1904.
5 SHEETS—SHEET 5.
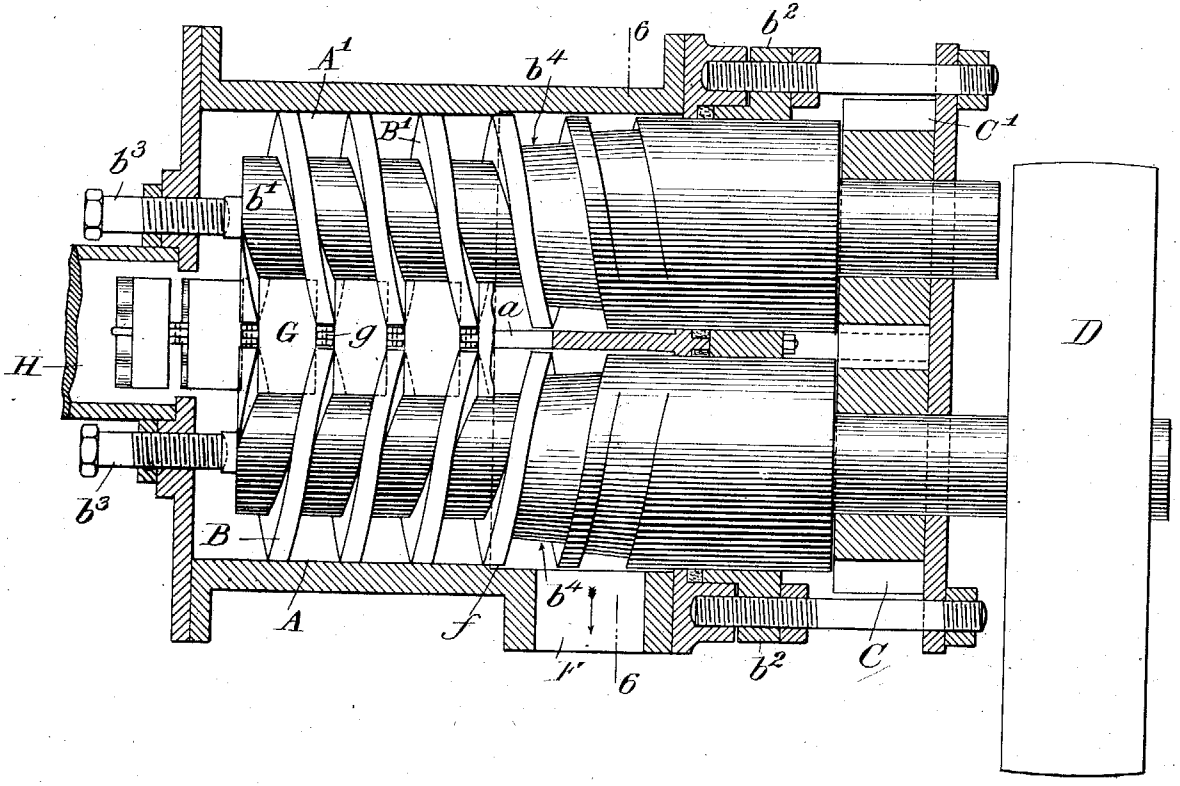
Witnesses:
Horace A. Crossman
Everett S. Emery
Inventor:
James Aitken
by Emery Booth & Powell
attys No. 12,259. Reissued August 23, 1904.

UNITED STATES PATENT OFFICE.

JAMES AITKEN, OF THE BREAKWATER, NEAR GEELONG, VICTORIA, AUSTRALIA.

ROTARY PUMP FOR AIR, WATER, OR OTHER FLUIDS.

SPECIFICATION forming part of Reissued Letters Patent No. 12,259, dated August 23, 1904.

Original No. 666,588, dated January 22, 1901. Application for reissue filed June 4, 1904. Serial No. 211,211.

*To all whom it may concern:*

Be it known that I, JAMES AITKEN, engineer, a subject of the King of Great Britain, residing at the Breakwater, near Geelong, in the State of Victoria, Australia, have invented an Improved Rotary Pump for Air, Water, or other Fluids, of which the following is a specification.

This invention has been devised in order to provide a rotary pump for air, water, or other fluids which will give a high efficiency with a minimum expenditure of power and which will not be liable to get out of order.

In order that my invention may be readily understood, I will describe it by reference to the accompanying drawings, in which—

Figure 3:
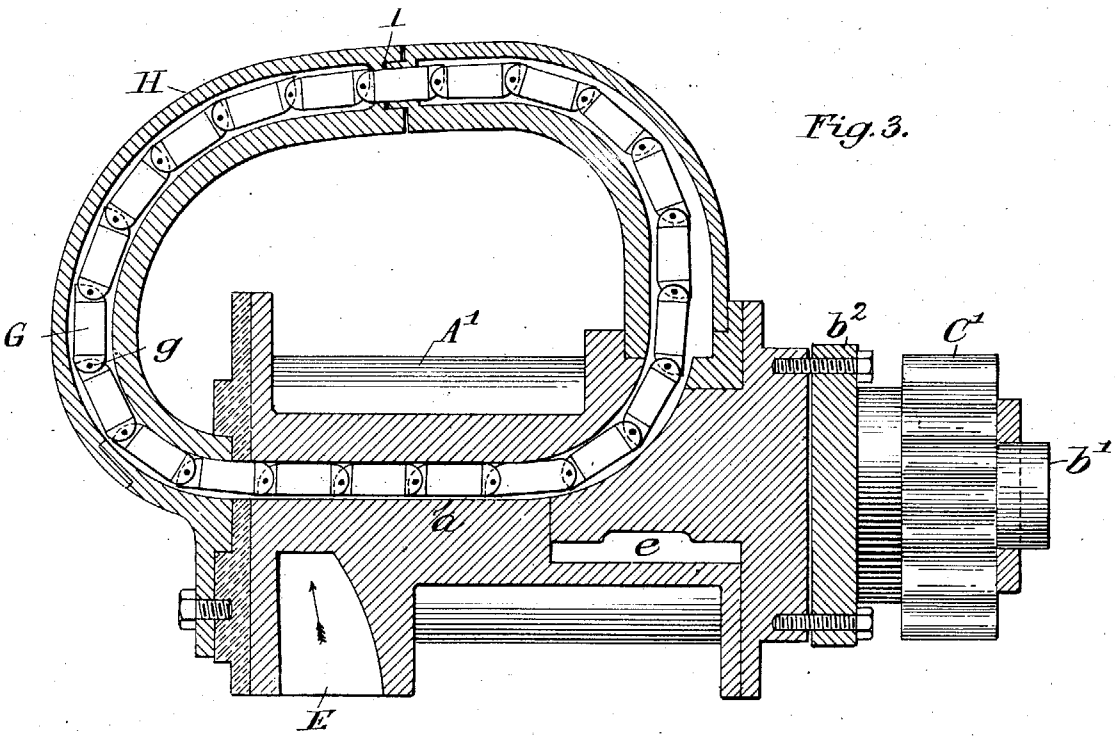
Figure 4:
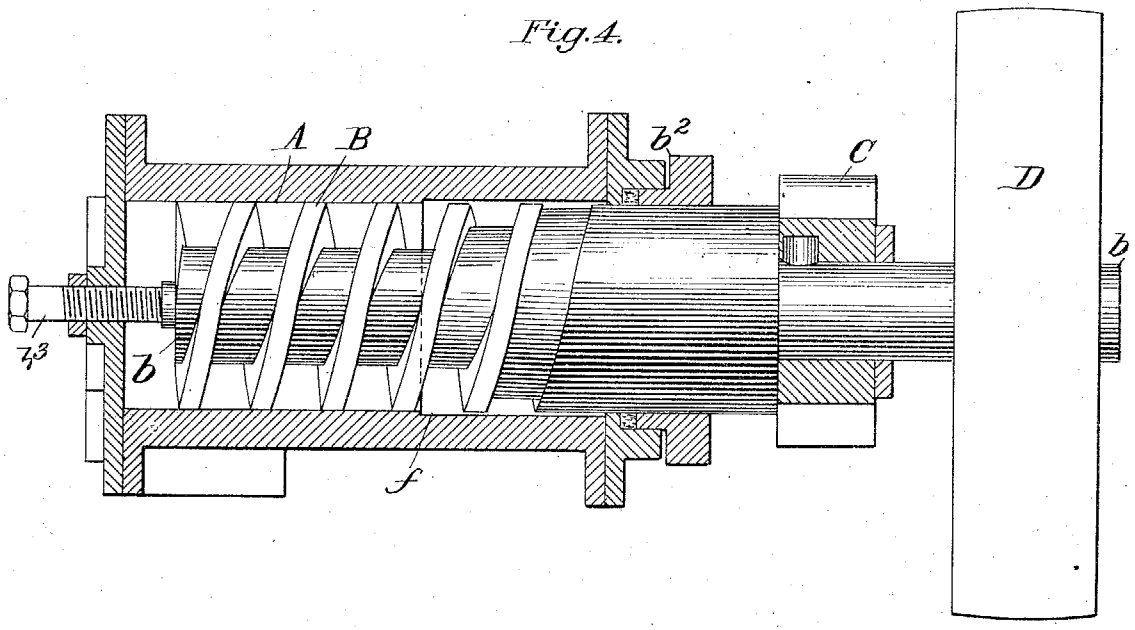

Figure 1 represents a side elevation, and Fig. 2 an end elevation, of my improved rotary pump. Fig. 3 is a vertical central longitudinal section on line 3 3, Fig. 2; and Fig. 4 is a vertical longitudinal section on line 4 4, Fig. 2. Fig. 5 is a horizontal section of the machine on line 5 5, Figs. 1 and 2. Fig. 6 is a vertical transverse section on line 6 6, Fig. 1; and Figs. 7 and 8 are a plan and section of a detail hereinafter described.

The same letters of reference indicate the same parts in all the figures.

My improved rotary pump for air, water, or other fluids consists, by preference, of a double casing or two casings A A′ in open communication laterally with each other through a passage *a*, extending from end to end of the inner or adjacent walls of the casings. Each of these casings is fitted with a screw B B′ of such a diameter as to form a working fit within the casings, and each of said screws is formed with, by preference, deep square threads, as shown, although, if found more convenient, other descriptions of threads may be employed. These screws B and B′ are mounted upon or provided with spindles *b b′*, and these spindles are fitted with spur-wheels C C′, gearing into each other, so that the two screws B B′ will always revolve synchronously when the requisite motion is imparted to one of said spindles by means, for instance, of a belt working around a pulley, such as D, thereupon.

E represents an inlet for the water, air, or other fluid, which is provided at one end of the casing or casings of the pump and which is in open communication with the inlet ends of both casings, while F represents an outlet, which is in correspondingly open communication with the other ends thereof, a port or passage *e* being provided to connect the outlet ends of said casings, as shown.

In order to insure the water, air, or other fluid passing along the casings instead of going direct from the inlet E to the outlet F, I divide the upper halves of the casings from the lower halves, thereby preventing the water passing around the threads without being propelled forwardly. I accomplish this result by means of an endless traveling chain or series of traveling fingers or stop-pieces G, arranged to enter the space between the casings at one end and to move along between the two screws B B′ until it passes out of the casings at the opposite end, subsequently returning to the starting-point along a passage or way H, which extends over the pump, as shown. The fingers or stops G are made of flat pieces of metal or other suitable material, with lugs *g* on the side to enable them to be connected together into a chain, as shown, by means of pins passing through said lugs, or the whole series might be constructed of some flexible material, after the manner of a band-saw, for instance. These said fingers or stop-pieces are arranged to correspond with the pitch of the screws B B′ and to fit closely into the spaces between the threads thereof. They are preferably constructed of two plates of metal or other suitable material clamped together with leather or other packing material *g′* between them. A stuffing-box I is provided in the passage or way H to allow the chain of stop-pieces or fingers to pass through, while maintaining a tight joint around them. Antifriction-rollers or other supports may be provided within the passage H to support and guide the chain of fingers or stop-pieces within the casing. Other stuffing-boxes $b^2$ are provided and suitably connected to the casings for the spindles or shafts *b b′* of the screws B B′. These screws B B′ are preferably made to taper slightly, like the plug of an ordinary valve or cock, set-screws $b^3$ being used for adjusting them as they become worn, and the threads are made of gradually-decreasing depth toward the discharge ends of the screws, as indicated at $b^4$—that is, the central parts of the screws are gradually increased in diameter toward said ends—the effect being to force the water or other fluid outward with gradually-increasing force. An internal annular recess $f$ is formed in the discharge ends of the casings to facilitate the discharge of the water or other fluid.

If desired, only one casing and screw can be used instead of having a pair of them arranged side by side, as shown, in which case the traveling fingers or stops will be arranged to travel along one side of the casing and to project into the spaces between the threads of the screw on one side, the opposite side of the chain of stops being left plain and arranged to work in a groove in the side of the casing.

In operation motion is imparted to the screws B B′, as above described, the effect being to draw water or other fluid into the casings A A′ through the inlet-port E. The fingers or stops G prevent this water or other fluid passing around the threads, and consequently compel it to move along to the opposite end of the casing—that is, it is drawn along said casings by means of said screws until it reaches the opposite end of the casing, when it escapes through the outlet-port F. In this way the water or other fluid can be raised to considerable heights with a minimum expenditure of power.

I claim—

1. In a rotary pump for air, water or other fluid, a casing provided with suitable inlet and discharge ports, a pair of spindles arranged in said casing and each of which is provided with screw-threads of gradually-decreasing depth toward the discharge end thereof, a passage or way H connected to said casing, and a continuous belt of traveling stops or fingers arranged in the said way and casing and adapted to engage the said threads, as and for the purpose set forth.

2. In a rotary pump for air, water or other fluid, a casing provided with suitable inlet and discharge ports, a pair of screws having threads of gradually-decreasing depth toward the discharge end thereof, means for operating said screws synchronously, a passage or way suitably connected to said cylinder, a continuous series of traveling stops or fingers arranged in the said way and casing and adapted to engage and have motion imparted thereto by the said threads, as and for the purpose set forth.

3. In a rotary pump for air, water or other fluid, the combination with a casing having an internal annular recess at its discharge end, of a pair of screws provided with threads of gradually-decreasing depth toward the discharge end thereof, and a suitably-arranged continuous series of stops or fingers adapted to engage and have motion imparted thereto by the said threads, as and for the purpose set forth.

4. A rotary pump for air, water or other fluid comprising a casing having inlet and outlet openings, a screw in said casing, a plurality of stops arranged to coöperate with and between the threads of said screw, means furnishing an endless path for said stops, and engaging surfaces between the stops such that the latter when traveling in said path turn about axes substantially parallel with the lengths of said stops in the direction of the thread depth, said screw and said stops having means for moving one relatively to the other.

5. A rotary pump for air, water or other fluid comprising a casing having inlet and outlet openings, a screw in said casing, a plurality of stops coöperating as described with said screw, and an endless way along which said stops travel and in said travel turn relatively about axes substantially midway between those edges of said stops that describe respectively the longest and shortest curvilinear movement in their travel.

6. A rotary pump for air, water or other fluid comprising a casing, a plurality of screws parallelly arranged therein and a plurality of stops arranged in endless path to coöperate with and between the convolutions of said screws.

7. A rotary pump for air, water or other fluid comprising a casing having inlet and outlet openings, a screw in said casing, a plurality of relatively movable stops arranged to enter the spaces between the threads of said screw, and an endless closed passage in which said stops are guided and supported, said screw and said stops having means for moving one relatively to the other.

8. A rotary pump for air, water or other fluid comprising a casing having inlet and outlet openings, a screw in said casing, a plurality of relatively movable stops arranged to coöperate in the spaces between the threads of said screw, an endless path for the stops in their movement from and to their engaging positions with the screw, and packing means in said path through which said stops pass, said screw and said stops having means for moving one relatively to the other.

9. A rotary pump for air, water or other fluid comprising a casing having inlet and outlet openings, a screw in said casing, a plurality of relatively movable stops arranged to coöperate in the spaces between the threads of said screw, a closed passage or way through which said stops pass on their travel from the said screw back to engagement therewith, and means to pack said stops in said passage or way; said passage or way in front of said packing means being in communication with the pressure end of a thread or threads of said screw and receiving pressure therefrom.

10. A rotary pump for air, water or other fluid comprising a casing having inlet and outlet openings, a screw in said casing having one or more stops arranged to coöperate in the spaces between its threads, said stop or stops being provided with separable members and packing material between the same, said screw and stops having means for moving one relatively to the other.

11. A rotary pump for air, water or other fluid comprising a casing having inlet and outlet openings, a screw in said casing, a plurality of relatively movable stops coöperating in the spaces between the threads of said screw, packing means through which said stops pass in their travel from engagement with said screw, and means wholly within the limits of the opposite packed faces of said stops to permit the latter to have swinging movement one relatively to another in the course of their travel, while permitting packing of the said stops as described.

12. A rotary pump for air, water or other fluid comprising a casing having inlet and outlet openings, a screw in said casing, a plurality of relatively movable stops coöperating in the spaces between the threads of said screw, said pump presenting to the feeding-face of the deepest thread in said screw a pressure-opposing area formed by gradually reducing the depths of said thread.

13. A rotary pump for air, water or other fluid comprising a casing having inlet and outlet openings, a screw in said casing, a plurality of relatively movable stops coöperating in the spaces between the threads of said screw, said pump presenting to the feeding-face of the deepest thread in said screw a pressure-opposing area.

JAMES AITKEN.

Witnesses:
W. T. LAWSON,
WILLIAM G. TIFFANY.